United States Patent
Elson

(10) Patent No.: US 8,387,735 B2
(45) Date of Patent: Mar. 5, 2013

(54) METHOD AND APPARATUS FOR REMOTELY DISABLING VEHICLES

(75) Inventor: John Todd Elson, Albuquerque, NM (US)

(73) Assignee: Fiore Industries, Inc., Albuquerque, NM (US)

( * ) Notice: Subject to any disclaimer, the term of this patent is extended or adjusted under 35 U.S.C. 154(b) by 995 days.

(21) Appl. No.: 12/022,999

(22) Filed: Jan. 30, 2008

(65) Prior Publication Data

US 2008/0223641 A1 Sep. 18, 2008

Related U.S. Application Data

(60) Provisional application No. 60/898,186, filed on Jan. 30, 2007.

(51) Int. Cl.
*B60L 3/04* (2006.01)

(52) U.S. Cl. ........................................ 180/167; 180/169

(58) Field of Classification Search ................. 180/167, 180/168, 169
See application file for complete search history.

(56) References Cited

U.S. PATENT DOCUMENTS

| | | | | |
|---|---|---|---|---|
| 3,112,004 | A * | 11/1963 | Neaville | 180/167 |
| 4,236,594 | A * | 12/1980 | Ramsperger | 180/167 |
| 4,619,231 | A * | 10/1986 | Stolar et al. | 123/333 |
| 4,660,528 | A * | 4/1987 | Buck | 123/333 |
| 5,293,527 | A * | 3/1994 | Sutton et al. | 340/825.57 |
| 5,503,059 | A * | 4/1996 | Pacholok | 89/1.11 |
| 5,533,589 | A * | 7/1996 | Critzer | 180/287 |
| 5,645,137 | A | 7/1997 | Pacholok | |
| 5,907,290 | A | 5/1999 | Turner et al. | |
| 5,933,075 | A | 8/1999 | Ditson | |
| 5,952,600 | A | 9/1999 | Herr | |
| 6,072,248 | A | 6/2000 | Muise et al. | |
| 6,124,805 | A * | 9/2000 | Gabbard | 340/825.72 |
| 6,135,226 | A | 10/2000 | Persichini et al. | |
| 6,232,884 | B1 * | 5/2001 | Gabbard | 340/825.72 |
| 6,371,000 | B1 * | 4/2002 | Hutmacher et al. | 89/1.11 |
| 6,411,217 | B1 * | 6/2002 | Gabbard | 340/5.1 |
| 6,411,887 | B1 | 6/2002 | Martens et al. | |
| 6,470,260 | B2 | 10/2002 | Martens et al. | |
| 6,664,888 | B1 * | 12/2003 | Bishop | 340/426.11 |
| 6,723,225 | B2 | 4/2004 | Scheps | |
| 6,897,762 | B2 * | 5/2005 | Howells | 340/5.31 |
| 7,015,792 | B2 | 3/2006 | Lessard et al. | |
| 7,024,278 | B2 * | 4/2006 | Chiappetta et al. | 700/245 |
| 7,049,709 | B2 | 5/2006 | Boggs | |
| 7,091,821 | B2 | 8/2006 | Lessard et al. | |
| 7,188,000 | B2 * | 3/2007 | Chiappetta et al. | 700/245 |
| 7,451,839 | B2 * | 11/2008 | Perlman | 180/2.1 |
| 7,598,846 | B2 * | 10/2009 | Griffin et al. | 340/426.11 |

(Continued)

OTHER PUBLICATIONS

"Development Laboratory", Flyer distributed at Fiore Industries Inc. Jul. 1, 2004 Open House.
"Fiore Industries Inc. Open House Invitation", 2004.

*Primary Examiner* — Jeffrey J Restifo
(74) *Attorney, Agent, or Firm* — Philip D. Askenazy; Deborah A. Peacock; Peacock Myers, P.C.

(57) ABSTRACT

Method and apparatus for remotely disabling a vehicle using modulated microwave energy. The modulation characteristics are preferably tailored for different types of vehicles. This approach enables the use of a low power radiation source, which minimizes injury to people and property and which enables the use of portable devices, such as for use on law enforcement or military vehicles.

8 Claims, 6 Drawing Sheets

U.S. PATENT DOCUMENTS

| | | |
|---|---|---|
| 7,760,076 B2 * | 7/2010 | Boggess ................ 340/426.11 |
| 2001/0040503 A1 | 11/2001 | Bishop |
| 2002/0070850 A1 | 6/2002 | Michala et al. |
| 2005/0038592 A1 * | 2/2005 | de Sylva ................ 701/101 |
| 2005/0184858 A1 * | 8/2005 | Griffin et al. ............ 340/426.11 |
| 2005/0195069 A1 | 9/2005 | Dunand |
| 2005/0242971 A1 | 11/2005 | Dryer |
| 2006/0250272 A1 * | 11/2006 | Puamau ................ 340/825.69 |
| 2008/0015744 A1 * | 1/2008 | Lund ................ 701/2 |
| 2008/0133052 A1 * | 6/2008 | Jones et al. ................ 700/245 |
| 2008/0223641 A1 * | 9/2008 | Elson ................ 180/167 |
| 2009/0248222 A1 * | 10/2009 | McGarry et al. ................ 701/2 |

* cited by examiner

METHOD AND APPARATUS FOR REMOTELY DISABLING VEHICLES

CROSS-REFERENCE TO RELATED APPLICATIONS

This application claims priority to and the benefit of filing of U.S. Provisional Patent Application Ser. No. 60/898,186, entitled "Method & Apparatus to Remotely Stop Individually Targeted Automobiles with Microwaves", filed on Jan. 30, 2007, which is incorporated herein by reference.

GOVERNMENT RIGHTS

The U.S. Government has a paid-up license in this invention and the right in limited circumstances to require the patent owner to license others on reasonable terms as provided for by the terms of Contract No. 2005-DE-BX-K029, awarded by the United States Department of Justice.

BACKGROUND OF THE INVENTION

1. Field of the Invention (Technical Field)

The present invention relates to methods and apparatuses for remotely stopping vehicle engines, preferably by using microwaves with frequency and modulation characteristics that are matched to susceptibilities of specific vehicle engine control systems (ECS).

2. Background Art

Note that the following discussion refers to a number of publications and references. Discussion of such publications herein is given for more complete background of the scientific principles and is not to be construed as an admission that such publications are prior art for patentability determination purposes.

Modern vehicle engines typically rely on computer control for such things as timing and air-fuel mixture. This control requires sensory input, and if interference can be added to the normal signals from these sensors, inaccurate feedback is provided to the ECS. If the difference between the actual signal and the "normal" signal is large enough, the ECS might simply ignore it, analogous to running in open loop mode. On the other hand, if the false signal is processed by the ECS and results in issuance of commands to change timing advance, air-fuel mixture, etc., the engine will potentially run poorly or stop.

Radiated microwave energy has been shown to stop modern internal combustion engines by disrupting the normal functions of the engine control unit (ECU) computer that controls the timing of the ignition and/or fuel delivery systems. Microwaves can couple into engine compartments via diffusion through the hood, slots, or from large gaps on the bottom. Of these coupling mechanisms, the first is insignificant because the attenuation of microwaves as they pass through the hood renders the signal on the other side extremely small. The other two mechanisms are rather frequency selective, depending heavily on the physical structure of the car. The distribution of microwave energy inside the engine compartment is likewise strongly dependent on frequency due to the physical layout of the various components. Because of this variance in the physical location, orientation, and interconnection of components within the ECS, in addition to the differing types of affected sensors, a particular narrow-band microwave signal which stops one vehicle is unlikely to stop another. Exceptions exist for obvious cases where the make and model of one vehicle bear much similarity to another due to manufacturer relationships (e.g. Plymouth Voyager and Dodge Caravan).

One significant drawback of microwave-based engine-stopping devices is the large size required, typically compared to available storage in a typical car, particularly a police squad car. These devices utilize high power and/or high bandwidth, so the required microwave source is large. Furthermore, the requirement for some directivity and relatively low microwave frequencies necessitates the use of large antennas. Also, the high power can permanently damage an ECU, and may result in collateral damage to other vehicles and people, such as bystanders using personal pacemakers.

SUMMARY OF THE INVENTION

Disclosure of the Invention

The present invention is a method of disabling a vehicle, the method comprising the steps of providing a database of one or more parameters for disabling specific vehicles, identifying a vehicle, and transmitting modulated microwave radiation to the vehicle, the radiation being varied according to one or more of the parameters specific to the vehicle. The parameters are preferably selected from the group consisting of frequency, amplitude modulation, pulse width modulation, and pulse repetition rate. The peak power required to disable the vehicle is preferably less than about 5 kW. The average power required to disable the vehicle is preferably less than about ten watts. The radiation is preferably narrowband L-band radiation. The method is optionally performed by an occupant of a second vehicle. The parameters for a specific vehicle are preferably chosen for the database to be those that disable the vehicle at the lowest transmitted power. The method optionally further comprises the step of varying a parameter of the transmitted radiation around the value of that parameter stored in the database.

The present invention is also an apparatus for disabling a vehicle, the apparatus comprising a portable power supply, a modulated narrowband microwave source, one or more antennas, and a database of parameters specific to a plurality of vehicles. The antennas preferably comprise an antenna array. The antennas are preferably selected from the group consisting of helical antennas and stub-loaded helical antennas. The antennas preferably radiate circularly polarized radiation. The antennas are optionally substantially conformal to a surface of a second vehicle. The source preferably comprises an L-band source and preferably transmits microwave energy having a peak power of less than about 5 kW and having an average power of less than about ten watts. The parameters are preferably selected from the group consisting of frequency, amplitude modulation, pulse width modulation, and pulse repetition rate. The apparatus is optionally contained in a second vehicle. The source is preferably variable according to the parameters in the database. The apparatus preferably further comprises a cooling system.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

The present invention is a microwave-based vehicle-specific engine-stopping device which preferably relies on the creation of a database which contains susceptibilities of vehicles and is used to control the microwave source in the device. No preinstalled hardware, such as a receiver, is required to be present in the target vehicle, and no physical or electrical contact with, or electrical discharge to, the target vehicle is necessary. The present invention preferably uses relatively higher narrowband frequencies, preferably in the approximately 1-2 GHz range (L-band), which not only have relatively higher coupling to engine compartments but also allow for high gain (~20 dB) antennas that can be made conformal to some surface of a car or other vehicle, for example the grill. The present invention preferably interferes with a lower characteristic operating frequency of the target system, for example ignition coil firing or clock frequency of a chip in the ECS.

The present invention also preferably modulates the waveform, including such characteristics as the amplitude and pulse width, of the microwave carrier signal, resulting in reductions of average transmitted power (typically between a factor of about 100 and 120) and peak power (typically between a factor of about 20 and 25), required to produce an engine disruption or stop. This modulation enables the radiation to penetrate into the engine compartment (or other compartment where the target computer is located) and couple with the target. As in the case of carrier frequency, these parameters are typically vehicle specific. This is an advantage, since the present invention can be operated to disable only the desired vehicle without disabling surrounding vehicles. In addition to enabling the portability of the device, reduction in transmit power reduces human exposure levels as well as the possibility of damage to ECS components. Resulting power levels of the device of the present invention are typically well below established damage thresholds for electronic devices. This enables, for example, law enforcement vehicles to stop individuals fleeing at a high rate of speed in an automobile without damaging the car or injuring the occupants.

As used throughout the specification and claims, "vehicle" means anything with an engine which utilizes a computer, processor, chip or the like for purposes including but not limited to whole or partial control and/or feedback.

Figure 1:
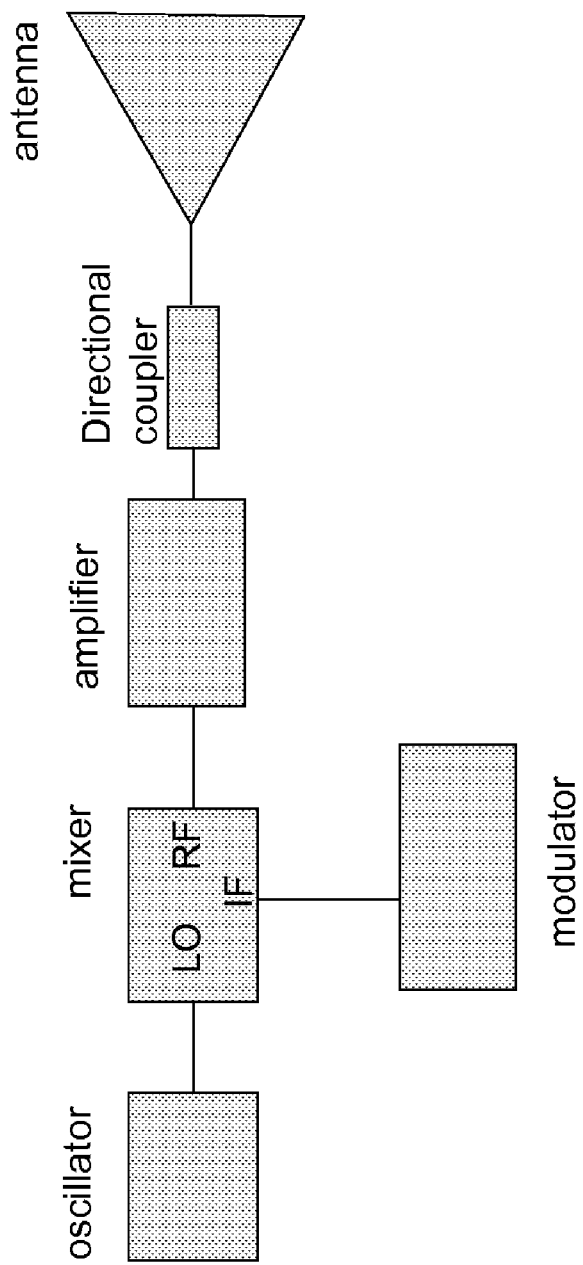
FIG. 1 is a schematic of an embodiment of the present invention.

A schematic of one embodiment of the present invention is shown in FIG. 1. The device preferably comprises a battery pack or other portable power source, a DC voltage supplied, frequency-agile, pulsewidth-modulated, narrowband microwave source, preferably comprising a solid state amplifier (and preferably a solid state preamplifier), an antenna, interconnecting cables, wires, waveguides, and a computer with access to a database containing vehicle susceptibilities. Polarization is preferably circular, but any polarization such as horizontal and/or vertical may optionally be employed. The solid state amplifier of the present invention preferably is rated at about 100 W output with approximately a 54 db gain and greater than about 30% efficiency. The amplifier is preferably battery powered. The amplifier stages preferably comprise a shutoff feature so that they will not draw power unless there is a signal.

A solid state source has higher efficiency and gain than other microwave sources, which means less cooling requirements, is small in size and weight, and is easy to install and maintain. Solid-state amplifiers are typically cooled with heat sinks that come with fans attached. However, the fans may be optional as cool air is provided when the source vehicle is moving. A radiant water cooling system and a series of water cooling jackets may be used as a backup cooling system.

It is preferable that an antenna array be employed. Because the array preferably has a relatively wide bandwidth, an array of helical antennas, which are inherently broadband, have relatively good gain per element, and are relatively inexpensive, is preferable. Helical antennas also radiate with circular polarization. A 20-25 element array of stub-loaded helical antennas, each having a length of about 12 inches and a radius of less than about 1.5 inches and comprising low-dielectric loss plastic should result in an overall antenna gain of 20-23 dB.

Figure 2B:
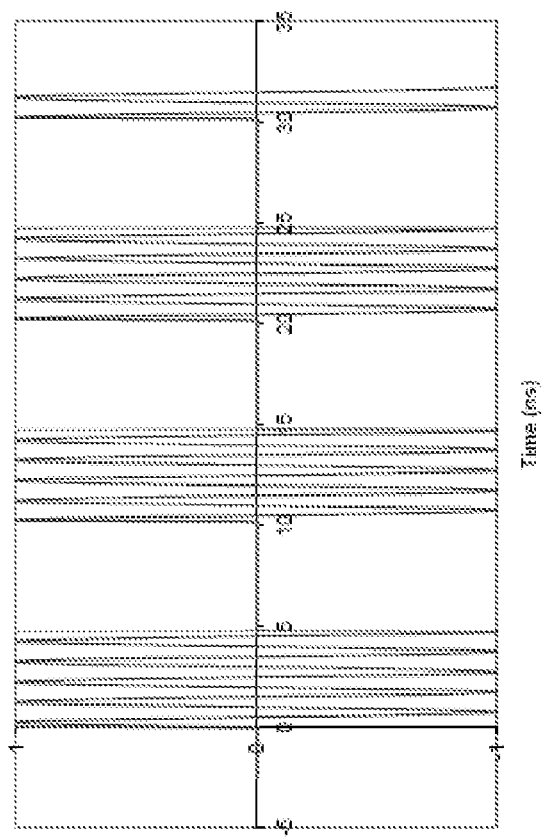
FIG. 2b shows pulse width modulation (PWM) (4.5 ns and 100 MHz) of a 1-GHz carrier signal.
Figure 2A:
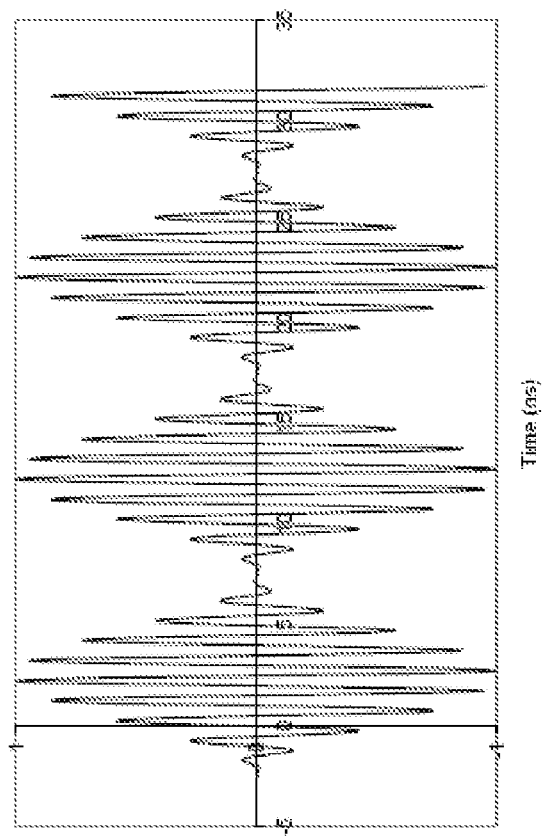
FIG. 2a shows 100-MHz amplitude modulation (AM) of a 1-GHz carrier signal.
Figure 3:
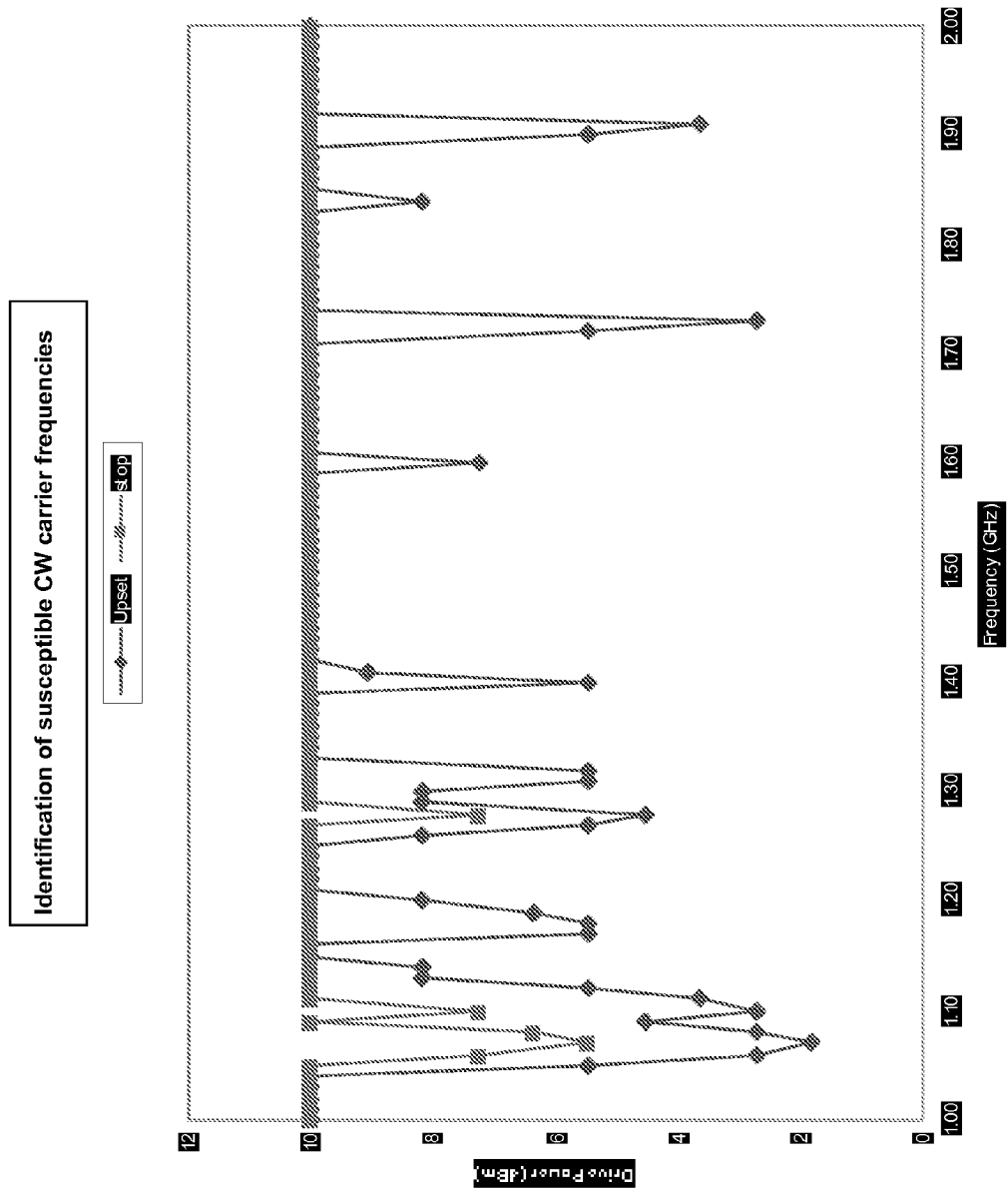
FIG. 3 shows example data points for which certain powers and frequencies resulted in vehicle upset or stoppage.
Figure 4:
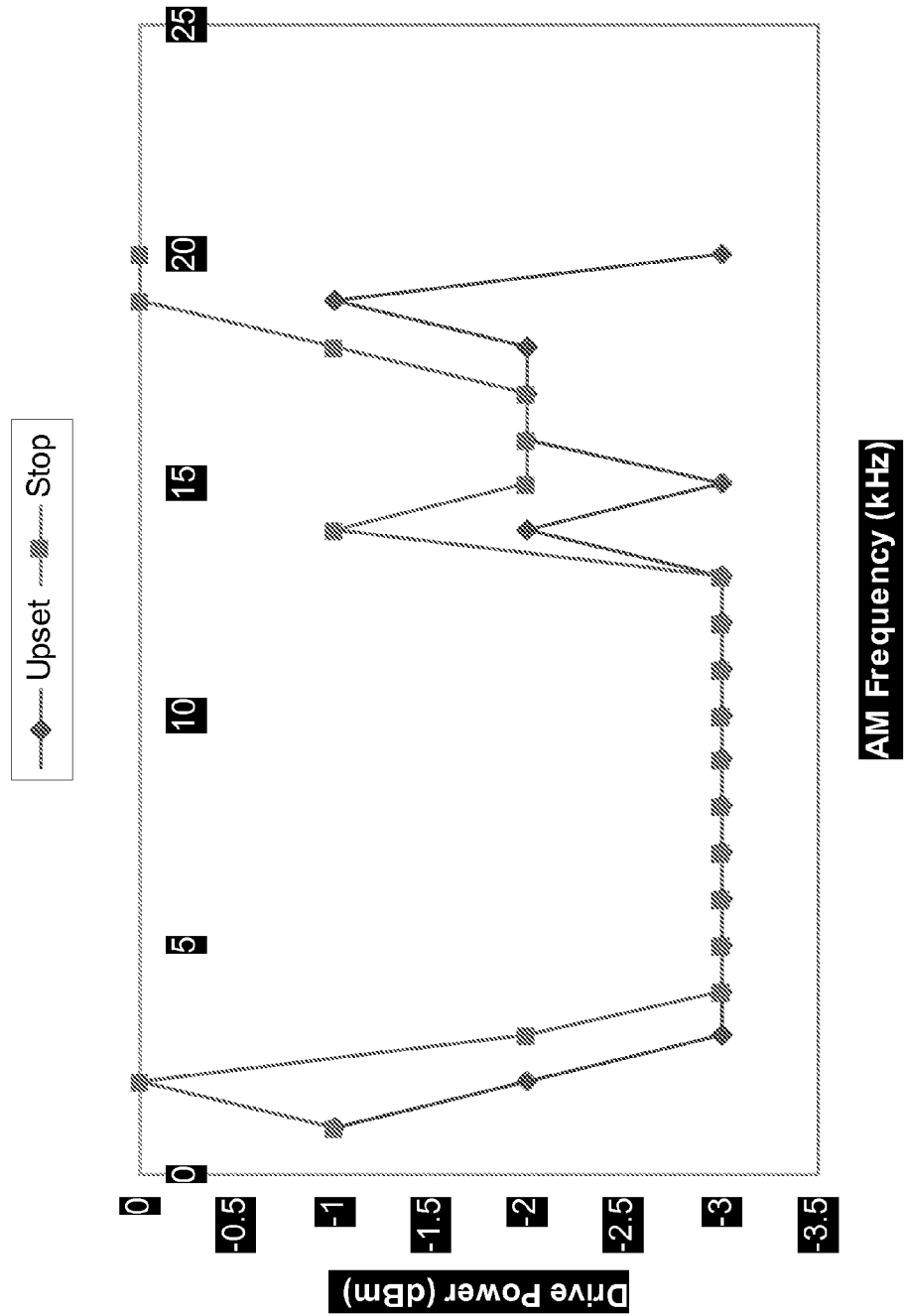
FIG. 4 shows example data points for which certain powers and amplitude modulations resulted in vehicle upset or stoppage.
Figure 5:
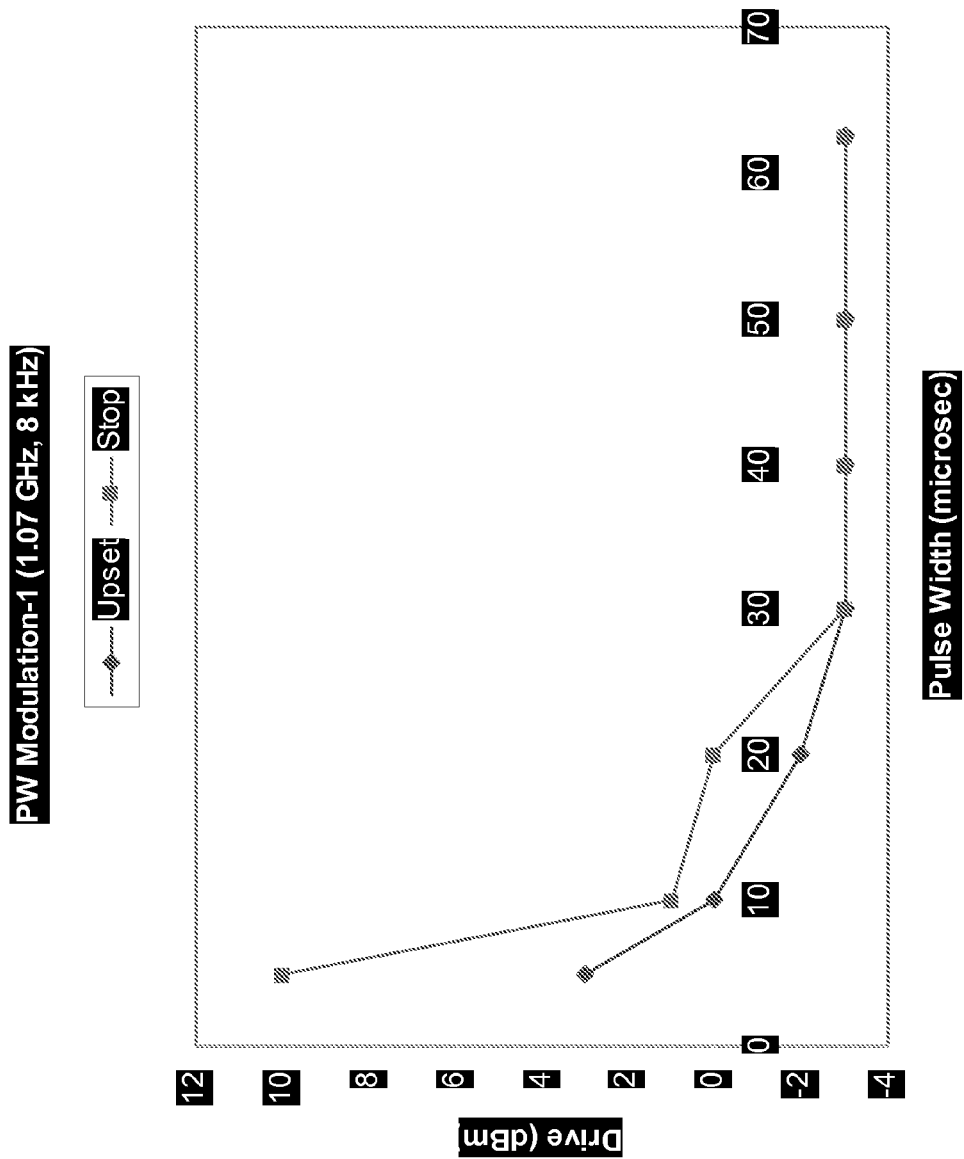
FIG. 5 shows example data points for which certain powers and pulse widths resulted in vehicle upset or stoppage.
Figure 6:
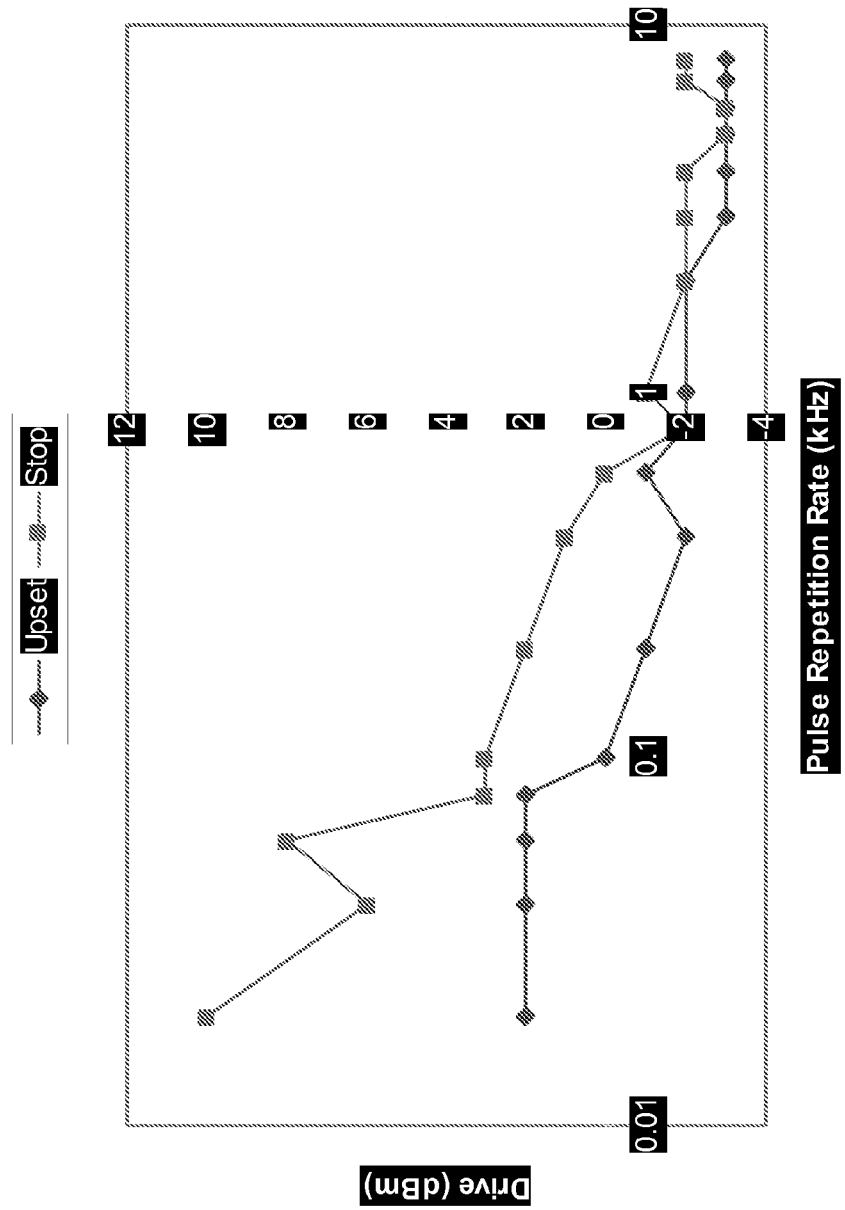
FIG. 6 shows example data points for which certain powers and pulse repetition rates resulted in vehicle upset or stoppage.

The microwave carrier is preferably modulated in amplitude and pulse width, examples of which are shown in FIGS. 2a and 2b respectively. By way of example, FIG. 2a shows 100-MHz amplitude modulation (AM) of a 1-GHz carrier signal, and FIG. 2b shows pulse width modulation (PWM) (4.5 ns and 100 MHz) of a 1-GHz carrier signal. The optimum modulation strategy is typically different for different vehicles. The present invention preferably utilizes a database of vehicle-dependent waveform criteria. For a given vehicle, optimum carrier frequencies are preferably identified by varying the radiated power at constant frequency and recording frequency and power at which the engine speed changes appreciably (an upset) and/or the engine stops. The frequency is then preferably incremented over the frequency range of the amplifier, with measurements made at each increment. For each optimum carrier frequency, the peak and average power reductions afforded by AM are then preferably determined by holding the carrier frequency and AM frequency constant, and varying source power to find upset and stopping thresholds. This is preferably iterated over the AM frequency range of the source. Power reduction due to pulse-width modulation (PWM) is then preferably determined by replicating the AM sine wave by a square-wave PWM waveform, systematically reducing the pulse width of the square wave while holding the pulse repetition frequency (PRF) constant, and systematically reducing the PRF while holding the pulse width constant.

The optimal setting for a particular vehicle is preferably determined by the particular combination of frequency modulation, PWM, and pulse repetition rate which stops the vehicle at the lowest power setting. Different modulation waveforms are typically required for different vehicles.

Because the present invention is strongly dependent on carrier frequency, ultra wideband (UWB) radiation is inferior to narrow band (NB). A UWB source would apply power in frequency bands where disruption to the engine is insignificant, so a UWB source will not perform as well as an NB source controlled by a database containing specific vehicle susceptibilities.

The presence of added metal objects in the engine compartment may affect the optimal carrier frequency; thus vehicles with after-market parts such as headers or cold-air intake systems might have slight changes in susceptibility from stock vehicles. Thus the system of the present invention may optionally scan the neighborhood of a target carrier frequency. Similarly, if the target vehicle is unknown, the device may transmit a plurality of microwave signals having different known modulation parameters until one such signal succeeds in disabling the target vehicle.

Example

A prototype unit was built and tested on a number of vehicles. Results for a Dodge Caravan are presented in FIGS. 3-6. (Because of the similarities in the vehicles, nearly identical results were obtained for a Plymouth Voyager.) The lines connecting the data points in these figures may be ignored. FIGS. 3-6 show respectively which combinations of drive power and frequency, AM frequency, pulse width, or pulse repetition resulted in an engine upset or engine stop. Polling the ECU via the diagnostic port indicated that air flow rate was significantly perturbed during irradiation, leading to increased engine load and changes in the timing advancement. However, no permanent ECU damage was observed.

A narrowband microwave transmitter was used, having the following approximate characteristics:

| | |
|---|---|
| Peak Power | 5 kW |
| Carrier Frequency Range | 1.1-1.6 GHz |
| PW Modulation | |
| Duty cycle | 0.1-1.0 |
| Frequency range | CW to 7500 Hz |
| Source Efficiency | 30-50% |
| Size | 2 × 3 × 1 = 6 cubic feet |
| Weight | 200 lbs |
| Cooling requirements | 10-20 kW |
| Antenna Gain | 20-25 dB |

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method of disabling a vehicle, the method comprising the steps of:
   providing a database of one or more parameters for disabling specific vehicles, the database accessible to a microwave transmitter;
   identifying a vehicle; and
   transmitting modulated microwave radiation to the vehicle using the microwave transmitter, the radiation being varied according to one or more of the parameters specific to the vehicle in order to disable the vehicle;
   wherein the vehicle does not comprise a receiver for receiving the transmitted modulated microwave radiation.

2. The method of claim 1 wherein the parameters are selected from the group consisting of frequency, amplitude modulation, pulse width modulation, and pulse repetition rate.

3. The method of claim 1 wherein the peak power required to disable the vehicle is less than about 5 kW.

4. The method of claim 1 wherein the average power required to disable the vehicle is less than about ten watts.

5. The method of claim 1 wherein the radiation is narrowband L-band radiation.

6. The method of claim 1 performed by an occupant of a second vehicle.

7. The method of claim 1 wherein the parameters for a specific vehicle are chosen for the database to be those that disable the vehicle at the lowest transmitted power.

8. The method of claim 1 further comprising the step of varying a parameter of the transmitted radiation around the value of that parameter stored in the database.

* * * * *